United States Patent [19]

Bouziane et al.

[11] Patent Number: 5,727,158

[45] Date of Patent: Mar. 10, 1998

[54] INFORMATION REPOSITORY FOR STORING INFORMATION FOR ENTERPRISE COMPUTING SYSTEM

[75] Inventors: M'hamed Bouziane; Robert C. Webber, III, both of Nashua, N.H.; Vincent A. Mastro, Needham, Mass.; Charles P. Rehberg, Nashua, N.H.; Barbara A. Nichols, Acton; Roxanne N. Myers, Watertown, both of Mass.

[73] Assignee: Integra Soft, Inc., Billerica, Mass.

[21] Appl. No.: 532,462

[22] Filed: Sep. 22, 1995

[51] Int. Cl.$^6$ ............................................. G06F 12/10
[52] U.S. Cl. .......................... 395/200.55; 395/200.76; 395/200.75
[58] Field of Search ........................... 395/200, 500, 395/600, 800, 138, 140, 50, 54, 62, 75–77, 427, 412, 200.55, 200.76, 200.75, 856, 287

[56] References Cited

U.S. PATENT DOCUMENTS

| | | | |
|---|---|---|---|
| 4,853,843 | 8/1989 | Ecklund | 395/600 |
| 4,937,768 | 6/1990 | Carver et al. | 364/571.01 |
| 5,369,761 | 11/1994 | Conley et al. | 395/600 |
| 5,437,025 | 7/1995 | Bale et al. | 395/600 |
| 5,437,027 | 7/1995 | Bannon et al. | 395/600 |
| 5,446,575 | 8/1995 | Lysakowski, Jr. | 395/200.01 |
| 5,487,141 | 1/1996 | Cain et al. | 395/135 |
| 5,535,325 | 7/1996 | Cattell et al. | 395/161 |

*Primary Examiner*—Mehmet B. Geckil
*Attorney, Agent, or Firm*—Richard A. Jordan

[57] ABSTRACT

An information processing system includes a plurality of data processing tools, an atomic information repository, and a plurality of generated translation engines. Each data processing tool processes data in accordance with an associated data model, and in the process generates access requests for accessing data in accordance with its associated data model. The atomic information repository stores data items using an organization in an atomic data model which corresponds to the combination of the data models associated with all of the tools. Each translation engine is associated with one of the tools. Each translation engine receives an access request from its associated tool in the associated tool's data model and performs a translation operation to translate the request to the repository's atomic data model, and initiates an access operation with the repository in connection with the translated access request. A system manager is provided which can, when a new tool is added to the system, update the repository's atomic data model to reflect the added tool's associated data model, generate a translation engine for the new tool, and also update the translation engines associated with the existing tools to reflect the update.

56 Claims, 5 Drawing Sheets

INFORMATION REPOSITORY FOR STORING INFORMATION FOR ENTERPRISE COMPUTING SYSTEM

FIELD OF THE INVENTION

The invention is directed generally to the field of digital data processing systems, and more particularly to information repositories for storing and facilitating the retrieval of large amounts of data for access by a variety of computing tools in an enterprise computing environment.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them.

Several strategies have been developed to allow for sharing of information in an enterprise computing environment. One problem that arises in an enterprise computing environment is that often the various users are using programs which have been developed based on a data model that assumes that the data that they receive, process and store will be unique to the program, which models often are convenient for the program developer for the particular type of operations to be performed by the program. However, in one strategy, all types of programs would be constrained to the same data model. There are several problems with this strategy. For example, all types of programs would be constrained to the same data model, which model may be efficient for some types of programs but very inefficient for other types of programs. In addition, such a strategy would require all program developers to conform to a single data model, which may reduce competitive advantages which developer' program may be able to otherwise have if they would be able to use a data model of their own selection.

Another strategy is to provide an information exchange engine which can translate data between models formats of the various programs which may be used in the enterprise computing environment. While this will allow each program to have its own data model, it may require acquiring and maintaining exchange engines for a number of programs, and a user to select an appropriate exchange engine when importing or exporting information from another program.

SUMMARY OF THE INVENTION

The invention provides a new and improved information repository for storing and facilitating the retrieval of large amounts of data for access by a variety of computing tools in an enterprise computing environment.

In brief summary, an information processing system includes a plurality of data processing tools, an atomic information repository, and a plurality of generated translation engines. Each data processing tool processes data in accordance with an associated data model, and in the process generates access requests for accessing data in accordance with its associated data model. The atomic information repository stores data items using an organization in an atomic data model which corresponds to the combination of the data models associated with all of the tools. Each translation engine is associated with one of the tools. Each translation engine receives an access request from its associated tool in the associated tool's data model and performs a translation operation to translate the request to the repository's atomic data model, and initiates an access operation with the repository in connection with the translated access request. A system manager is provided which can, when a new tool is added to the system, update the repository's atomic data model to reflect the added tool's associated data model, generate a translation engine for the new tool, and also update the translation engines associated with the existing tools to reflect the update.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
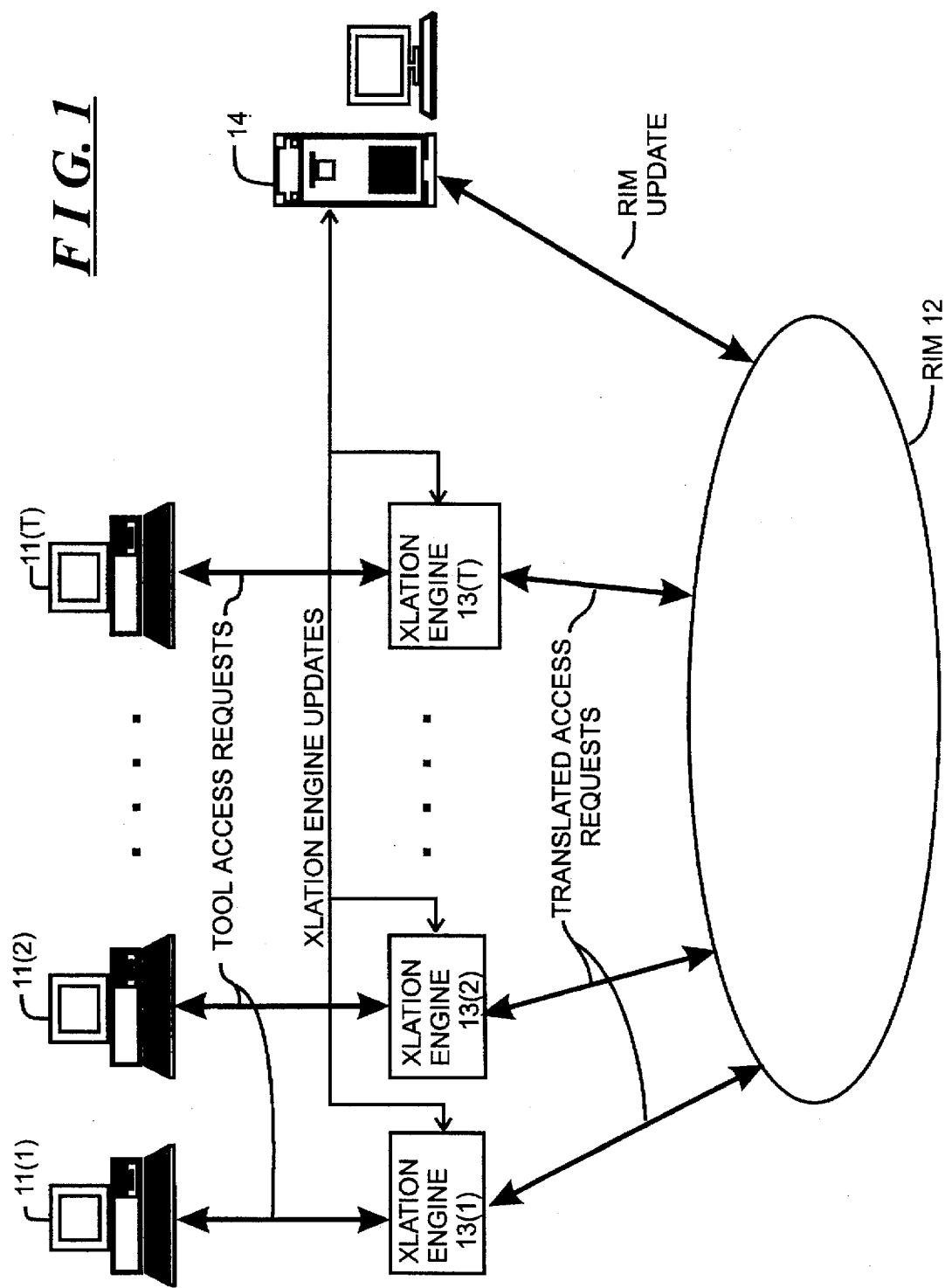
FIG. 1 is a functional block diagram of an enterprise computing processing system including an information repository constructed in accordance with the invention.

FIG. 1 is a functional block diagram of an enterprise computing system 10 including an information repository constructed in accordance with the invention. With reference to FIG. 1, the enterprise computing system 10 includes a plurality of "tools" 11(1) through 11(T) (generally identified by reference numeral 11(*t*)), which access a common data structure, termed herein a repository information manager ("RIM") 12 through respective translation engines 13(1) through 13(T) (generally identified by reference numeral 13(*t*)). The tools 11(*t*) generally comprise, for example, diverse types of database management systems and other applications programs which access shared data which is stored in the RIM 12. The database management systems and applications programs generally comprise computer programs which are executed in conventional manner by digital computer systems. In addition, in one embodiment the translation engines 13(*t*) comprise computer programs executed by digital computer systems (which may be the same digital computer systems on which their respective tools 12(*t*) are executed, and the RIM 12 is also maintained on a digital computer system. The tools 11(*t*), RIM 12 and translation engines 13(*t*) may be processed and maintained on a single digital computer system, or alternatively they may be processed and maintained on a number of digital computer systems which may be interconnected by, for example, a network (not shown), which transfers data access requests, translated data access requests, and responses between the computer systems on which the tools 11(*t*) and translation engines 13(*t*) are processed and which maintain the RIM 12.

While they are being processed, the tools 11(*t*) may generate data access requests to initiate a data access operation, that is, a retrieval of data from or storage of data in the RIM 12. On the other hand, the data will be stored in the RIM 12 in an "atomic" data model and format which will be described below. Typically, the tools 11(t) will "view" the data stored in the RIM 12 in a variety of diverse characteristic data models and formats, as will be described below, and each translation engine 13(t), upon receiving a data access request, will translate the data between respective tool's characteristic model and format and the atomic model format of RIM 12 as necessary. For example, during an access operation of the retrieval type, in which data items are to be retrieved from the RIM 12, the translation engine 13(t) will identify one or more atomic data items in the RIM 12 that jointly comprise the data item to be retrieved in response to the access request, and will enable the RIM 12 to provide the atomic data items to the translation engine 13(t). The translation engine 13(t), in turn, will aggregate the atomic data items that it receives from the RIM 12 into one or more data item(s)s as required by the tool's characteristic model and format, and provide the aggregated data item(s) to the tool 11(t) which issued the access request. Contrariwise, during an access request of the data storage type, in which data in the RIM 12 is to be updated or new data is to be stored in the RIM 12, the translation engine 13(t) receives the data to be stored in the tool's characteristic model and format, translates the data into the atomic model and format for the RIM 12, and provides the translated data to the RIM 12 for storage. If the data storage access request enables data to be updated, the RIM 12 will substitute the newly-supplied data from the translation engine 13(t) for the current data. On the other hand, if the data storage access request represents new data, the RIM 12 will add the data, in the atomic format as provided by the translation engine 13(t), to the current data which it is maintaining.

The enterprise computing system 10 further includes a system manager 14 which maintains and updates the atomic format of the RIM 12 and the translation engines 13(t) as tools 11(t) are added to the system 10. It will be appreciated that certain operations performed by the system manager 14 may be under control of an operator (not shown). Briefly, when the system 10 is initially established or when one or more tools 11(t) is added to the system 10 whose data models and formats differ from the current data models and formats, the system manager 14 determines the differences and modifies the data model and format of the data in the RIM 12 to accommodate the data model and format of the new tool 11(t). In that operation, the system manager 14 will (in one embodiment, under control of an operator) determine an atomic data model which is common to the data models of any tools 11(t) which are currently in the system 10 and the tool 11(t) to be added, and enable the data model of the RIM 12 to be updated to the new atomic data model. In addition, the system manager 14 will update the translation engines 13(t) associated with any tools 11(t) currently in the system based on the updated atomic data model of the RIM 12, and will also generate a translation engine 13(t) for the new tool 11(t) to be added to the system. Accordingly, the system manager 14 ensures that the translation engines 13(t) of all tools 11(t), including any tools 11(t) currently in the system as well as a tool 11(t) to be added conform to the atomic data models and formats of the RIM 12 when they (that is, the atomic data models and formats) of the RIM are changed to accommodate addition of a tool 11(t) in the enterprise computing system 10.

Before proceeding further, it would be helpful to provide a specific example illustrating characteristic data models and formats which may be useful for various tools 11(t) and an atomic data model and format useful for the RIM 12. It will be appreciated that the specific characteristic data models and formats for the tools 11(t) will depend on the particular tools 11(t) which are present in a specific enterprise computing system 10. In addition, it will be appreciated that the specific atomic data models and formats for RIM 12 will depend on the atomic data models and formats which are used for tools 11(t), and will effectively represent the aggregate or union of the finest-grained elements of the data models and format for all of the tools 11(t) in the system 10.

The specific example, which will be described in connection with FIG. 2, will be directed to a design database for designs for, for example, a particular type of product, in particular, identified as a "cup" such as a drinking cup or other vessel for holding liquids which may be used for manufacturing or otherwise fabricating the physical wares. Using that illustrative database, the tools may be used to, for example, add cup design elements to RIM 12, modify cup design elements stored in the RIM 12, and re-use and associate particular cup design elements in the RIM 12 with a number of cup designs, with the RIM 12 and translation engines 13(t) providing a mechanism by which a number of different tools 11(t) can share the elements stored in the RIM 12 without having to agree on a common schema or model and format arrangement for the elements.

Continuing with the aforementioned example, in one particular embodiment, the RIM 12 stores data items in an "entity-relationship" format, with each entity being a data item and relationships reflecting relationships among data items, as will be illustrated below. The entities are in the form of "objects" which may, in turn, be members or instances of classes and subclasses, although it will be appreciated that other models and formats may be used for the RIM 12. FIG. 2 depicts an illustrative class structure 20 for the "cup" design database. With reference to FIG. 2, the illustrative class structure 20 includes a main class 21, two sub-classes 22(1) and 22(2) which depends from the main class 21, and two lower-level sub-classes 23(1)(1) and 23(1)(2) both of which depend from subclass 22(1). Using the above-referenced example, if the main class 21 represents data for "cup" as a unit or entity as a whole, the two upper-level subclasses 22(1) and 22(2) may represent, for example, "container" and "handle" respectively, where the "container" subclass is for data items for the container portion of cups in the inventory, and the "handle" subclass is for data items for the handle portion of cups in the inventory. Each data item in class 21, which is termed an "entity" in the entity-relationship format, may represent a specific cup or specific type of cup in the inventory, and will have associated attributes which define various characteristics of the cup, with each attribute being identified by a particular attribute identifier and data value for the attribute.

Similarly, each data item in classes 22(1) and 22(2), which are also "entities" in the entity-relationship format, may represent container and handle characteristics of the specific cups or types of cups in the inventory. More specifically, each data item in class 22(1) will represent the container characteristic of a cup represented by a data item in class 21, such as color, sidewall characteristics, base characteristics and the like. In addition, each data item in class 22(2) will represent the handle characteristics of a cup that is represented by a data item in the class 21, such as curvature, color position and the like. In addition, it will be appreciated that there may be one or more relationships between the data items in class 22(1) and the data items in class 22(2), which correspond to the "relationship" in the entity-relationship format, which serves to link the data items in the classes 22(1) and 22(2). For example, there may be a "has" relationship, which signifies that a specific container represented by a data item in class 22(1) "has" a handle represented by a data item in class 22(2), which may be identified in the "relationship." In addition, there may be a "number" relationship, which signifies that a specific container represented by a data item in class 22(1) has a specific number of handles represented by the data item in class 22(2) specified by the "has" relationship. Further, there may be a "position" relationship, which specifies the position(s) on the container represented by a data item in class 22(1) at which the handle(s) represented by the data item in class 22(2) specified by the "has" relationship are mounted. It will be appreciated that the "number" and "position" relationships may be viewed as being subsidiary to, and further defining, the "has" relationship. Other relationships will be apparent to those skilled in the art.

Similarly, the two lower-level subclasses 23(1)(1) and 23(1)(2) may represent various elements of the cups or types of cups in the inventory. In the illustration depicted in FIG. 2, the subclasses 23(1)(1) and 23(1)(2) may, in particular "sidewall type" and "base type" attributes, respectively. Each data item in subclasses 23(1)(1) and 23(1)(2), which are also "entities" in the entity-relationship format, may represent sidewall and base handle characteristics of the containers (represented by entities in subclass 22(1) of specific cups or types of cups in the inventory. More specifically, each data item in class 23(1)(2) will represent the sidewall characteristic of a container represented by a data item in class 22(1). In addition, each data item in subclass 23(1)(2) will represent the characteristics of the base of a cup that is represented by a data item in the class 21 In addition, it will be appreciated that there may be one or more relationships between the data items in subclass 23(1)(1) and the data items in class 23(1)(2), which correspond to the "relationship" in the entity-relationship format, which serves to link the data items in the classes 23(1)(1) and 23(1)(2). For example, there may be a "has" relationship, which signifies that a specific container represented by a data item in subclass 23(1)(1) "has" a base represented by a data item in class 23(1)(2), which may be identified in the "relationship." Other relationships will be apparent to those skilled in the art.

Figure 2:
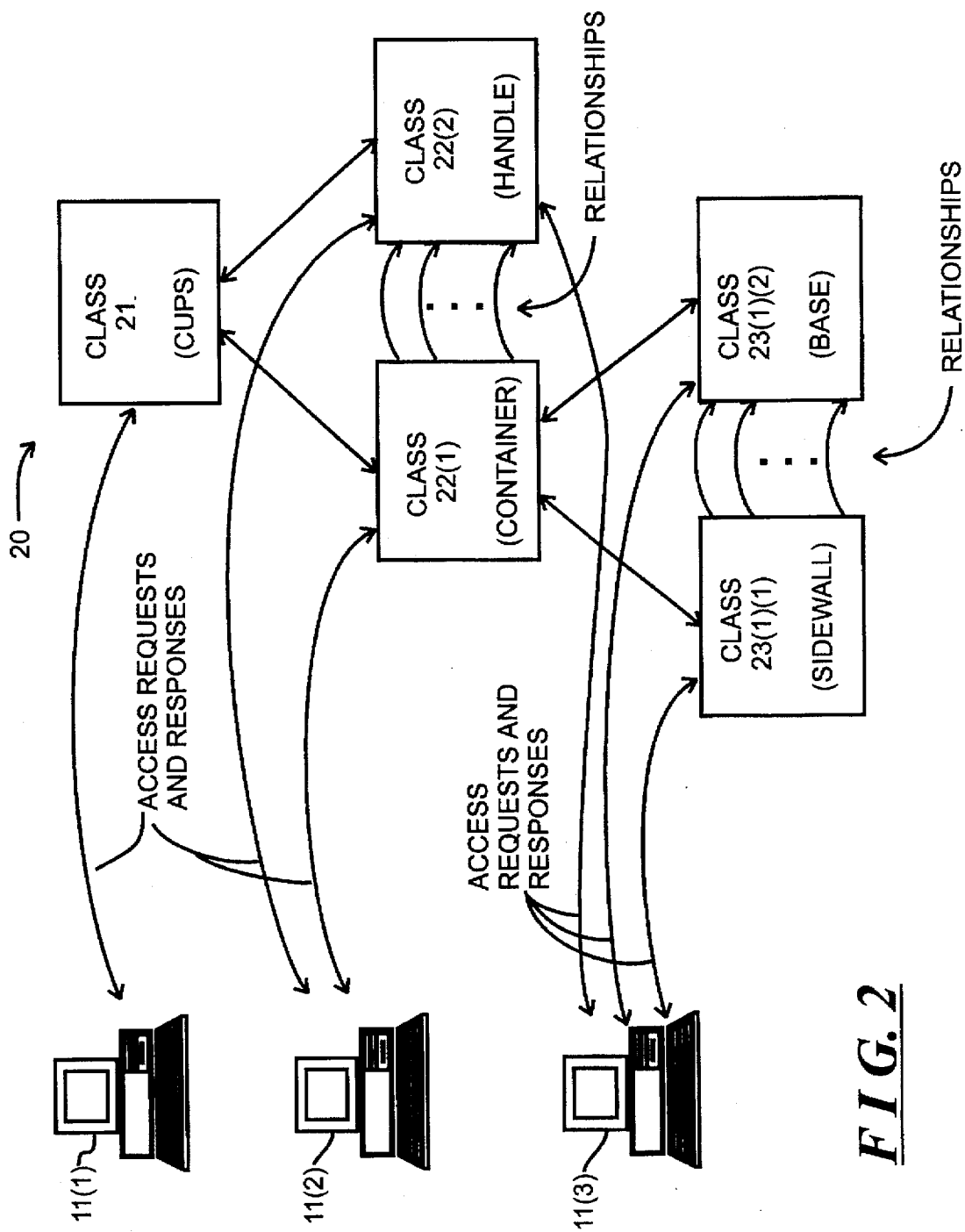
FIG. 2 is a block diagram useful in understanding the operations of the system depicted in FIG. 1.

It will be appreciated that certain ones of the tools depicted in FIG. 1, such as tool 11(1) as shown in FIG. 2, may have characteristic data models and format which view the cups in the above illustration as entities in the class 21. That is, a data item is a "cup" and characteristics of the "cup" which are stored in the RIM 12 are attributes and attribute values for the cup design associated with the data item. For such a view, in an access request of the retrieval type, such tools 11(t) will provide their associated translation engines 13(t) with the identification of a "cup" data item in class 21 to be retrieved, and will expect to receive at least some of the data item's attribute data, which may be identified in the request, in response. Similarly, in response to an access request of the storage type, such tools will provide their associated translation engines 13(t) with the identification of the "cup" data item to be updated or created and the associated attribute information to be updated or to be used in creating a new data item.

On the other hand, others of the tools, such as tool 11(2) as shown in FIG. 2, may have characteristic data models and formats which view the cups separately as the container and handle entities in classes 22(1) and 22(2). In that view, there are two data items, namely "container" and "handle" associated with each cup, each of which has attributes which describe the respective container and handle. In that case, each data item each may be independently retrievable and updatable and new data items may be separately created for each of the two classes. For such a view, the tools 11(t) will, in an access request of the retrieval type, provide their associated translation engines 13(t) with the identification of a container or a handle to be retrieved, and will expect to receive the data item's attribute data in response. Similarly, in response to an access request of the storage type, such tools 11(t) will provide their associated translation engines 13(t) with the identification of the "container" or "handle" data item to be updated or created and the associated attribute data. Accordingly, these tools 11(t) view the container and handle data separately, and can retrieve, update and store container and handle attribute data separately.

Figure 3:
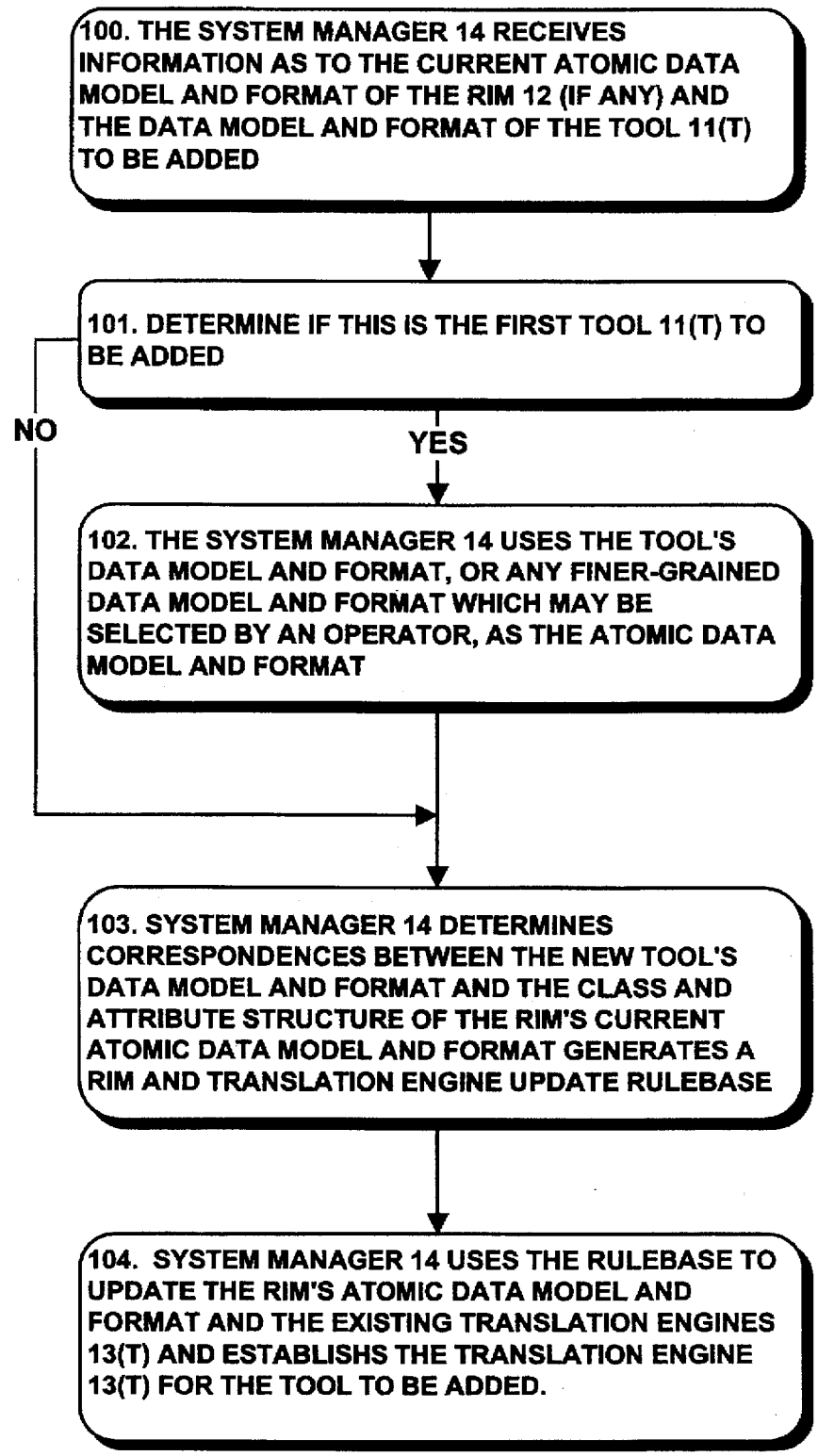
FIGS. 3, 4 and 4A depict flowcharts useful in understanding operations in connection with the information repository depicted in FIG. 1.

In addition, others of the tools, such as tool 11(3) shown in FIG. 3, may have characteristic formats which view the cups separately as sidewall, base and handle entities in classes 23(1)(1), 23(1)(2) and 22(2). In that view, there are three data items, namely, "sidewall," "base" and "handle" associated with each cup, each of which has attributes which describe the respective sidewall, base and handle. In that case, each data item each may be independently retrievable, updateable and new data items may be separately created for each of the three classes 23(1)(1), 23(1)(2) and 22(2). For such a view, the tools 11(t) will, in an access request of the retrieval type, provide their associated translation engines 13(t) with the identification of a sidewall, base or a handle whose data item is to be retrieved, and will expect to receive the data item's attribute data in response. Similarly, in response to an access request of the storage type, such tools 11(t) will provide their associated translation engines 13(t) with the identification of the "sidewall," "base" or "handle" data item whose attribute(s) is (are) to be updated, or for which a data item is to be created, along with the associated data. Accordingly, these tools 11(t) view the cup's sidewall, base and handle data separately, and can retrieve, update and store container and handle data separately.

As described above, the RIM 12 stores data in an "atomic" data model and format. That is, with the class structure 20 for the "cup" design base as depicted in FIG. 2, the RIM 12 will store the data items in the most detailed format as required by the class structure. Accordingly, the RIM 12 will store data items as entities in the atomic format "sidewall," "base," and "handle," since that is the most detailed format for the class structure 20 depicted in FIG. 2. With the data in the RIM 12 stored in such an atomic format, the translation engines 13(t) which are associated with the tools 11(t) which view the cups as entities in class 21 will, in response to an access request related to a cup, translate the access request into three access requests, one for the "sidewall," one for the "base" and the last for the "handle" for processing by the RIM 12. For an access request of the retrieval type, the RIM 12 will provide the translation engine 13(t) with appropriate data items for the "sidewall," "base" and "handle" access requests. In addition, if a tool 11(t) uses a name for a particular attribute which differs from the name of the corresponding attribute used for the data items stored in the RIM 12, the translation engines 13(t) will translate the attribute names in the request to the attribute names as used in the RIM 12. The RIM 12 will provide the requested data items for each request, and the translation engine 13(t) will combine the data items from the RIM 12 into a single data item for transfer to the tool 11(t), in the process performing an inverse translation in connection with attribute name(s) in the data item(s) as provided by the RIM 12, to provide the tool 11(t) with data items using attribute name(s) used by the tool 11(t). Similarly, for an access request of the storage type, the translation engine 13(t) will generate, in response to the data item which it receives from the tool 11(t), storage requests for each of the sidewall, base and handle entities to be updated or generated, which it will provide to the RIM 12 for storage, in the process performing attribute name translation as required.

Similarly, the translation engines 13(t) which are associated with the tools 11(t) which view the cups as entities in classes 22(1))("container") and 22(2) ("handle") will, in response to an access request related to a container, translate the access request into two access requests, one for the "sidewall," and the other for the "base" for processing by the RIM 12, in the process performing attribute name translation as described above. For an access request of the retrieval type, the RIM 12 will provide the translation engine 13(t) with appropriate data items for the "sidewall" and "base" access requests, and the translation engine 13(t) will combine the two data items from the RIM 12 into a single data item for transfer to the tool 11(t), also performing attribute name translation as required. Similarly, for an access request of the storage type, the translation engine 13(t) will generate, in response to the data item which it receives from the tool 11(t), storage requests for each of the sidewall and base entities to be updated or generated, in the process performing attribute name translation as required, which it will provide to the RIM 12 for storage. It will be appreciated that the translation engines 13(t) associated with tools 11(t) which view the cups as entities in classes 22(1) and 22(3), in response to access requests related to a handle, need only perform attribute name translation, since the RIM 12 stores handle data in "atomic" format.

On the other hand, translation engines 13(t) which are associated with the tools 11(t) which view the cups as entities separately in classes 23(1)(1) ("sidewall"), 23(1)(2) ("base"), and 22(2) ("handle"), may, with RIM 12, need only perform attribute name translation, since these classes correspond to the atomic format of the RIM 12.

As noted above, the system manager 14 operates to maintain and update the RIM 12 and translation engines 13(t) as tools 12(t) are added to the system 10 (FIG. 1). For example, if the RIM 12 is initially established based on the system 10 including a tool 11(1) which views the cups as entities in class 21, then the atomic data model and format of the RIM 12 will be based on that class. Accordingly, data items in the RIM 12 will be directed to the respective "cups" in the design base and the attributes associated with each data item may include such information as container, sidewall, base, and handle (not as separate data items, but as attributes of the "cup" data item), as well as color and so forth. In addition, the translation engine 13(1) which is associated with that tool 11(1) will be established based on the initial atomic format for RIM 12. If the RIM 12 is initially established based on a single such tool, based on identifiers for the various attributes as specified by that tool, and if additional such tools 11(t) (that is, additional tools 11(t) which view the cups as entities in class 21) are thereafter added for which identifiers of the various attributes differ, the translation engines 13(t) for such additional tools will be provided with correspondences between the attribute identifiers as used by their respective tools and the attribute identifiers as used by the RIM 12 where the attributes for the additional tools correspond to the original tool's attributes but are identified differently. It will be appreciated that, if an additional tool has an additional attribute which does not correspond to an attribute used by a tool previously added to the system 10 and in RIM 12, the attribute can merely be added to the data items in the RIM 12, and no change will be necessary to the pre-existing translation engines 13(t) since the tools 11(t) associated therewith will not access the new attribute. Similarly, if a new tool 11(t) has an additional class for data which is not accessed by the previously-added tools in the system 10, the class can merely be added and no change will be necessary to the pre-existing translation engines 13(t) since the tools 11(t) associated therewith will not access data items in the new class.

If, after the RIM 12 has been established based on tools 11(t) for which the cups are viewed as entities in class 21, a tool 11(t) is added to the system 10 which views the cups as entities in classes 22(1) and 22(2), the system manager 14 will perform two general operations. In one operation, the system 14 will determine a reorganization of the data in the RIM 12 so that the atomic data model and format will correspond to classes 22(1) and 22(2), in particular identifying attributes (if any) in each data item which are associated with class 22(1) and attributes (if any) which are associated with class 22(2). In addition, the system manager will establish two data items, one corresponding to class 22(1) and the other corresponding to class 22(2), and provide the attribute data for attributes associated with class 22(1) in the data item which corresponds to class 22(1) and the attribute data for attributes associated with class 22(2) in the data item which corresponds to class 22(2). After the system manager 14 determines the new data item and attribute organization for the atomic format for the RIM 12, in the second general operation it will generate new translation engines 13(t) for the pre-existing tools 11(t) based on the new organization. In addition, the system manager 14 will generate a translation engine 13(t) for the new tool 11(t) based on the attribute identifiers used by the new tool and the pre-existing attribute identifiers.

If a tool 11(t) is added to the system 10 which views the cups as entities in classes 23(1)(1), 23(1)(2) and 22(2) as described above in connection with FIG. 2, the system manager 14 will similarly perform two general operations. In one operation, the system 14 will determine a reorganization of the data in the RIM 12 so that the atomic format will correspond to classes 23(1)(1), 23(1)(2) and 22(2), in particular identifying attributes (if any) in each data item which are associated with class 23(1)(1), attributes (if any) which are associated with class 23(1)(2) and attributes (if any) which are associated with class 22(2). In addition, the system manager will establish three data items, one corresponding to class 23(1)(1), one corresponding to class 23(1)(2) and the other corresponding to class 22(2). (It will be appreciated that, if the system manager 14 has previously established data items corresponding to class 22(2), it need not do so again, but need only establish the data items corresponding to classes 23(1)(1) and 23(1)(2).) In addition, the system manager 14 will provide the attribute data for attributes associated with class 22(1) in the data item which corresponds to class 22(1) and (if necessary) the attribute data for attributes associated with class 22(2) in the data item which corresponds to class 22(2). After the system manager 14 determines the new data item and attribute organization for the atomic format for the RIM 12, it will generate new translation engines 13(t) for the pre-existing tools 11(t) based on the new organization. In addition, the system manager 14 will generate a translation engine 13(t) for the new tool 11(t) based on the attribute identifiers used by the new tool and the pre-existing attribute identifiers used in connection with the RIM 12.

It will be appreciated that, by updating and regenerating the class structure as described above as tools 11(t) are added to the system, the system manager 14 essentially creates new atomic models by which previously-believed atomic components are decomposed into increasingly-detailed atomic components. In addition, the system manager 14, by revising the translation engines 13(t) associated with the tools 11(t) currently in the system 10, essentially re-maps the tools 11(t) to the new RIM organization based on the atomic decomposition. Indeed, only the portion of the translation engines 13(t) which are specifically related to the further atomic decomposition will need to be modified or updated based on the new decomposition, and the rest of the respective translation engines 13(t) can continue to run without modification.

The detailed operations performed by the system manager 14 in updating the RIM 12 and translation engines 13(t) to accommodate addition of a new tool to system 10 will depend on the relationships (that is, mappings) between the particular data models and formats of the existing RIM 12 and current tools 11(t), on the one hand, and the data model and format of the tool to be added. In one particular embodiment, the system manager 14 establishes the new format for the RIM 12 and generates updated translation engines 13(t) using a rule-based methodology which is based on relationships between each class and subclasses generated therefore during the update procedure, on attributes which are added to objects or entities in each class and in addition on the correspondences between the attribute identifiers used for existing attributes by the current tool(s) 11(t) and the attribute identifiers as used by the new tool 11(t). An operator, using the system manager 14, can determine and specify the mapping relationships between the data models and formats used by the respective tools 11(t) and the data model and format used by the RIM 12, and can maintain a rulebase from the mapping relationships which it can use to generate and update the respective translation engines 13(t).

In its operations as described above, to ensure that the data items in the RIM 12 can be updated in response to an access request of the storage type, the system manager 14 will associate each tool object 11(t) with a class whose associated data item(s) will be deemed "master physical items," and a specific relationship, if any, to other data items. Preferably, the system manager 14 will select as the master physical item the particular class which is deemed the most semantically equivalent to the object of the tool's data model. Other data items, if any, which are related to the master physical item are deemed secondary physical items in the graph. For example, with reference to FIG. 2, for tool 11(1), the system manager 14 will identify the data items associated with class 21 as the master physical items, since that is the only class associated with the tool 11(1). Since there are no other classes associate with tool 11(1) there are no secondary physical items; the directed graph associated with tool 11(1) effectively has one node, namely, the node associated with class 21.

On the other hand, for tool 11(2), the system manager 14 may identify class 22(1) as the class whose data items will be deemed "master physical items" In that case, data items associated with class 22(2) will be identified as "secondary physical items." In addition, the system manager 14 will select one of the relationships, identified by the arrows identified by the legend "RELATIONSHIPS" between classes 22(1) and 22(2) in FIG. 2, as a selected relationship. In that case, the data items in RIM 12 that are associated with class 22(1) as a master physical item, and data items associated with class 22(2), as a secondary physical item, as interconnected by the arrow representing the selected relationship, form respective directed graphs. In performing an update operation in response to an access request from tool 11(2), the directed graph that is associated with the data items to be updated is traversed from the master physical item and the appropriate attributes and values updated. In traversing the directed graph, conventional graph-traversal algorithms can be used to ensure that each data item in the graph, can, as a graph node, be appropriately visited and updated, thereby ensuring that the data items are updated.

Similarly, for tool 11(3) (FIG. 3) the system manager 14 may identify class 23(1)(1) as the class whose data items will be deemed "master physical items." In that case, the data items associated with classes 23(1)(2) and 22(2) will be deemed secondary physical items, and the system manager 14 may select one of the direct relationships (represented by arrows identified by the legend "RELATIONSHIPS" between class 23(1)(1) and class 23(1)(2)) as the specified relationship. Although there is no direct relationship shown in FIG. 2 between class 23(1)(1) and class 22(2), it will be appreciated that, since the class 23(1)(1) is a subclass of class 22(1), it (class 23(1)(1)) will inherit certain features of its parent class 22(1), including the parent class's relationships, and so there is, at least inferentially, a relationship between class 23(1)(1) and class 22(2) which is used in establishing the directed graphs for tool 11(3). Accordingly, in performing an update operation in response to an access request from tool 11(3), the directed graph that is associated with the data items to be updated is traversed from the master physical item associated with class 23(1) and the appropriate attributes and values updated. In traversing the directed graph, conventional graph-traversal algorithms can be used to ensure that each data item in the graph, can, as a graph node, be appropriately visited and updated, thereby ensuring that the data items are updated.

Figure 4:
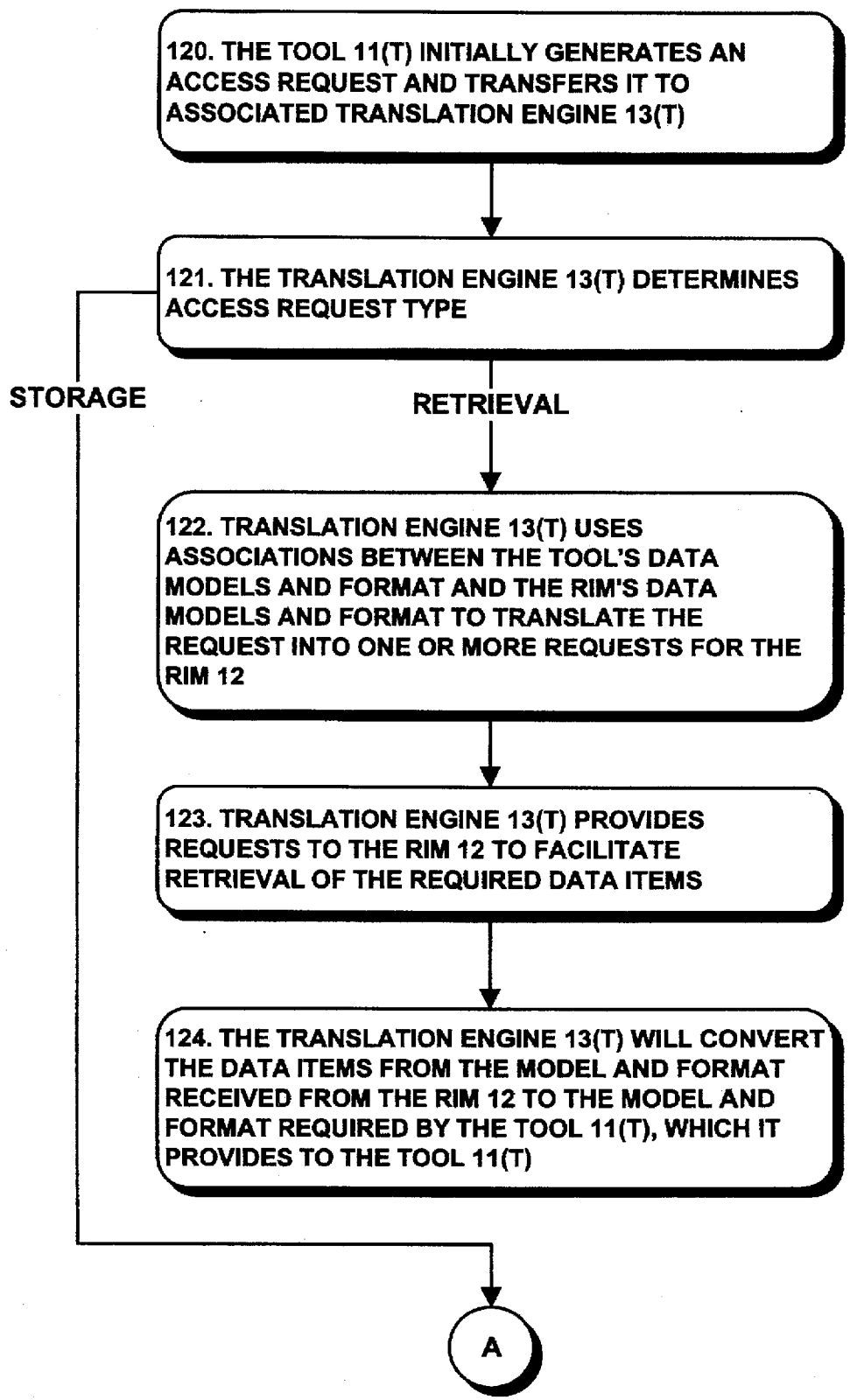

With this background, specific operations performed by the system manager 14 and translation engines 13(t) will be described in connection with FIGS. 3 and 4, respectively. Initially, with reference to FIG. 3, in establishing or updating the RIM 12 when a new tool 11(t) is to be added to the system 10, the system manager 14 initially receives information as to the current atomic data model and format of the RIM 12 (if any) and the data model and format of the tool 11(t) to be added (step 100). If this is the first tool 11(t) to be added (the determination of which is made in step 101), the system manager 14 can use the tool's data model and format, or any finer-grained data model and format which may be selected by an operator, as the atomic data model and format (step 102). On the other hand, if the system manager 14 determines that this is not the first tool 11(t) to be added, correspondences between the new tool's data model and format, including the new tool's class and attribute structure and associations between that class and attribute structure and the class and attribute structure of the RIM's current atomic data model and format will be determined and a RIM and translation engine update rulebase generated therefrom as noted above (step 103). After the rulebase has been generated, the system manager 14 can use the rulebase to update the RIM's atomic data model and format and the existing translation engines 13(t) as described above, and in addition can establish the translation engine 13(t) for the tool to be generated (step 104).

Thereafter, a translation engine 13(t) has been generated or updated for a tool 11(t), it can be used in connection with access requests generated by the tool 11(t). Operations performed in connection with an access request will be described in connection with FIGS. 4 and 4A. With reference to FIG. 4, the tool 11(t) will initially generate an access request, which it will transfer to its associated translation engine 13(t) (step 120). After receiving the access request, the translation engine 13(t) will determine the request type, that is, if it is a retrieval request or a storage request (121). If the request is a retrieval request, the translation engine 13(t) will use its associations between the tool's data models and format and the RIM's data models and format to translate the request into one or more requests from the RIM 12 (step 122), which it provides to the RIM 12 to facilitate retrieval by it of the required data items (step 123). On receiving the data items from the RIM 12, the translation engine 13(t) will convert the data items from the model and format received from the RIM 12 to the model and format required by the tool 11(t), which it provides to the tool 11(t) (step 124).

Figure 4A:
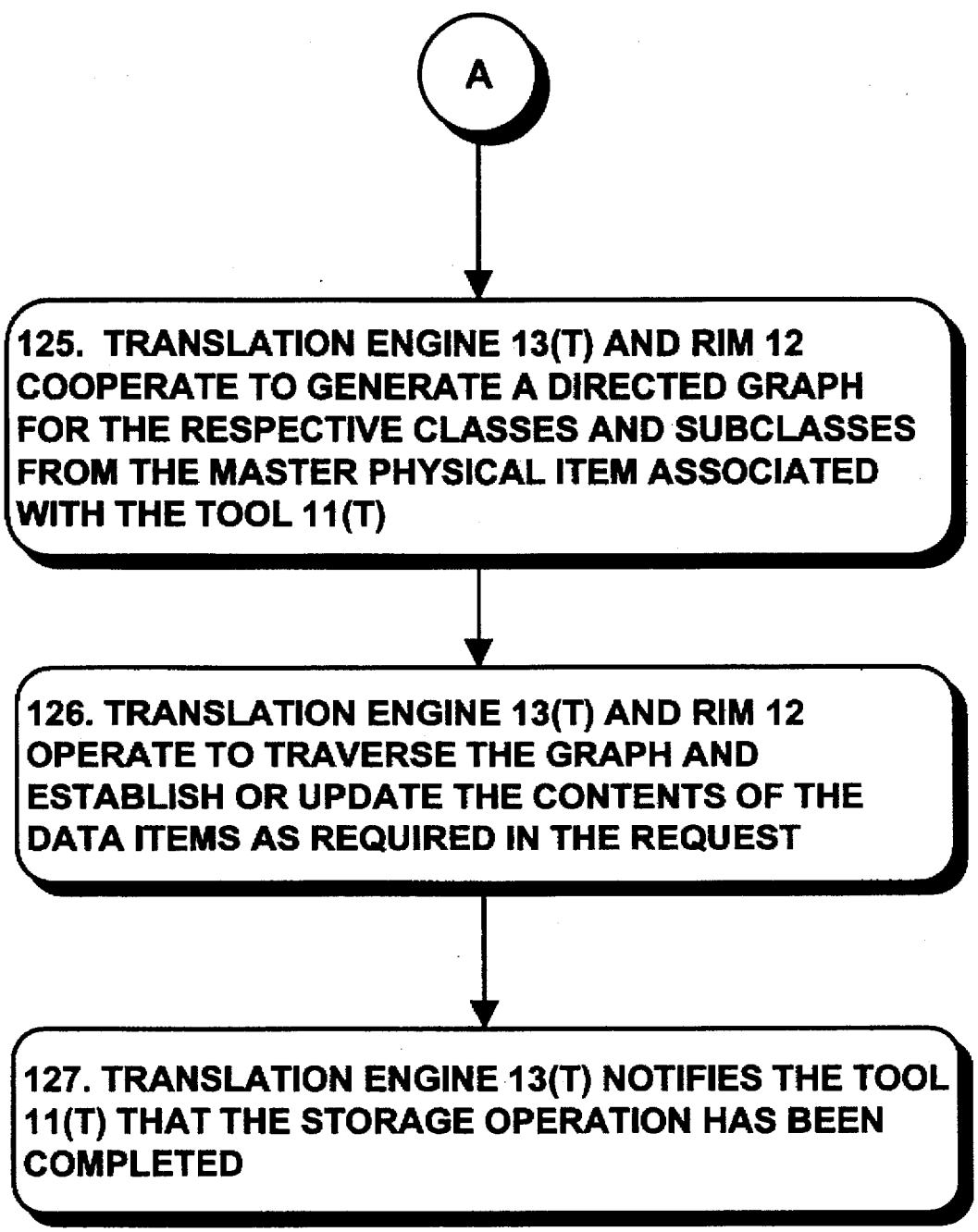

On the other hand, with reference to FIG. 4A, if the translation engine determines in step 121 that the request is a storage request, including a request to update a previously-stored data item, the translation engine 13(t) will, with the RIM 12, generate a directed graph for the respective classes and subclasses from the master physical item associated with the tool 11(t) (step 125). If the operation is an update operation, the directed graph will comprise, as graph nodes, existing data items in the respective classes and subclasses, and if the operation is to store new data the directed graph will comprise, as graph nodes, empty data items which can be used to store new data included in the request. After the directed graph has been established, the translation engine 13(t) and RIM 12 operate to traverse the graph and establish or update the contents of the data items as required in the request (step 126). After the graph traversal operation has been completed, the translation engine 13(t) can notify the tool 11(t) that the storage operation has been completed (step 127).

It will be appreciated that the invention provides a number of advantages. In particular, it provides for the efficient sharing and updating of information by a number of tools 11(t) in an enterprise computing environment, without the need for constraining the tools 11(t) to any predetermined data model, and further without requiring the tools 11(t) to use information exchange programs for exchanging information between pairs of respective tools. The invention provides an atomic repository information manager ("RIM") 12 that maintains data in an atomic data model and format which may be used for any of the tools 11(t) in the system, which may be readily updated and evolved in a convenient manner when a new tool 11(t) is added to the system to respond to new system and market requirements.

Furthermore, by associating each tool 11(t) with a "master physical item" class, directed graphs are established among data items in the RIM 12, and so updating of information in the RIM 12 in response to an update request can be efficiently accomplished using conventional directed graph traversal procedures.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An information repository system comprising:

A. an atomic information repository for storing data items for accessing by a plurality of data processing tools, each tool having a respective data model, each data model defining at least one class each having at least one data item with an associated attribute, said attribute having at least one value, at least one class associated with the data model of at least one tool having a plurality of subclasses each comprising a said class associated with another of said tools, the data items being organized in said atomic information repository in an atomic data model corresponding to the combination of the data models associated with all of said data processing tools;

B. a plurality of generated translation engines each associated with a said tool, each translation engine (i) receiving an access request from its associated tool in the associated tool's data model, (ii) performing a translation operation to translate the request from the associated tool's data model to the repository's atomic data model, and (iii) initiating an access operation with the repository in connection with the translated access request.

2. An information repository system as defined in claim 1 further comprising a plurality of data processing tools, each tool processing data in accordance with its associated data model, each tool generating an access request for accessing data in accordance with its associated data model.

3. An information repository system as defined in claim 1 in which at one translation engine receives from its associated tool an access request of a retrieval type to initiate retrieval of data items from said repository, said at least one translation engine being responsive to said retrieval access request for translating the retrieval access request into at least one translated access request in accordance with the associated tool's data model.

4. An information repository system as defined in claim 3 in which said repository, in response to receipt of a translated access request from said at least one translation engine, provides one or more data items to said at least one translation engine, said at least one translation engine formatting said at least one data item in accordance with its associated tool's data model for provision to the associated tool.

5. An information repository system as defined in claim 3 in which at one translation engine receives from its associated tool an access request of a retrieval type to initiate retrieval of data from said repository, said at least one translation engine being responsive to said retrieval access request for translating the retrieval access request into one or more translated access requests in accordance with the associated tool's data model.

6. An information repository system as defined in claim 5 in which said repository, in response to receipt of said translated access requests from said at least one translation engine, provides one or more data items to said at least one translation engine, said at least one translation engine formatting said at least one or more data items in accordance with its associated tool's data model for provision as the requested data to the associated tool.

7. An information repository system as defined in claim 1 in which at least one translation engine receives from its associated tool an access request of a storage type to initiate storage of at least one data item in said repository, said at least one translation engine being responsive to said storage access request for translating the storage access request into at least one translated access request in accordance with the associated tool's data model, said translated access request including said at least one data item.

8. An information repository system as defined in claim 7 in which said repository, in response to receipt of said translated access request from said at least one translation engine, stores said at least one data item in accordance with said translated access request.

9. An information repository system as defined in claim 7 in which at one translation engine receives from its associated tool an access request of a storage type to initiate storage of data in said repository, said at least one translation engine being responsive to said storage access request for translating the storage access request into one or more translated access requests all in accordance with the associated tool's data model, each said translated access request including a data item for storage in said repository.

10. An information repository system as defined in claim 7 in which the classes of the data models of said tools define a plurality of hierarchical classes defined according to an entity-relationship model, the atomic data model also having a plurality of classes defined according to an entity-relationship model, for each class in each tool's data model one class in the repository's data model being identified as a master class and other classes in the repository's data model being identified as secondary classes, the entity-relationship atomic data model defining a directed graph for each tool from a master class through a series of said secondary classes.

11. An information repository system as defined in claim 10 in which at one translation engine receives from its associated tool an access request of a storage type to initiate storage of data items in said repository, said at least one translation engine being responsive to said storage access request for translating the storage access request into a plurality of translated access requests all in accordance with the associated tool's data model, each said translated access request including a data item for storage in said repository thereby to generate a said directed graph associated with the data items being stored.

12. An information repository system as defined in claim 1 further comprising a system manager for generating a new translation engine for a new tool and update the repository's atomic data model.

13. An information repository system as defined in claim 12 in which the system manager generates said new translation engine and updates the repository's atomic data model from a determination of correspondences between the new tool's data model and the structure of the repository's current atomic data model.

14. An information repository system as defined in claim 13 in which the system manager in addition updates the translation engines in response to the repository's updated atomic data model.

15. A method of operating an information repository comprising the steps of:
  A. enabling a translation engine, associated with one of a plurality of tools, to receive an access request from its associated tool in the associated tool's data model,
  B. enabling translation engine to perform a translation operation to translate the access request to generate a translated access request in accordance with an atomic data model of an atomic information repository, the atomic information repository storing data items for accessing by said plurality of data processing tools, each tool having a respective data model, each data model defining at least one class each having at least one data item with an associated attribute, said attribute having at least one value, at least one class associated with the data model of at least one tool having a plurality of subclasses each comprising a said class associated with another of said tools, the data items being organized in said atomic information repository in an atomic data model corresponding to the combination of the data models associated with all of a plurality of data processing tools; and
  C. enabling said translation engine to initiate an access operation with the repository in connection with the translated access request.

16. A method as defined in claim 15 further comprising the step of enabling at least one of a plurality of data processing tools, each of which processes data in accordance with its associated data model, to generate an access request for accessing data in accordance with its associated data model.

17. A method as defined in claim 15 in which at one translation engine, in response to receipt from its associated tool of an access request of a retrieval type to initiate retrieval of data items from said repository, is enabled to translate the retrieval access request into at least one translated access request in accordance with the associated tool's data model.

18. A method as defined in claim 17 in which said at least one translation engine, on receipt of at least one data item from said repository in response to said translated access request, is enabled to format said at least one data item in accordance with its associated tool's data model for provision to the associated tool.

19. A method as defined in claim 17 in which at one translation engine, in response to receipt from its associated tool an access request of a retrieval type to initiate retrieval of data from said repository, is enabled to translate said retrieval access request into a plurality of translated access requests all in accordance with the associated tool's data model.

20. A method as defined in claim 19 in which said at least one translation engine, on receipt of one or more data items from said repository in response to said translated access requests, is enabled to format said at least one or more data items in accordance with its associated tool's data model for provision as the requested data to the associated tool.

21. A method as defined in claim 15 in which at least one translation engine, in response to receipt from its associated tool an access request of a storage type to initiate storage of at least one data item in said repository, is enabled to translate said storage access request into at least one translated access request in accordance with the associated tool's data model, said translated access request including said at least one data item.

22. A method as defined in claim 21 in which said repository, in response to receipt of said translated access request from said at least one translation engine, is enabled to store said at least one data item in accordance with said translated access request.

23. A method as defined in claim 21 in which at one translation engine, in response to receipt from its associated tool of an access request of a storage type to initiate storage of data in said repository, is enabled to translate the storage access request into one or more translated access requests all in accordance with the associated tool's data model, each said translated access request including a data item for storage in said repository.

24. A method as defined in claim 21 in which the data models of said tools define a plurality of hierarchical classes defined according to an entity-relationship model, the atomic data model also having a plurality of classes defined according to an entity-relationship model, for each class in each tool's data model one class in the repository's data model being identified as a master class and other classes in the repository's data model being identified as secondary classes, the entity-relationship atomic data model defining a directed graph for each tool from a master class through a series of said secondary classes.

25. A method as defined in claim 24 in which at one translation engine receives from its associated tool an access request of a storage type to initiate storage of data items in said repository, said at least one translation engine being responsive to said storage access request for translating the storage access request into a plurality of translated access requests all in accordance with the associated tool's data model, each said translated access request including a data item for storage in said repository thereby to generate a said directed graph associated with the data items being stored.

26. A method as defined in claim 15 further comprising the step of generating a new translation engine for a new tool and update the repository's atomic data model.

27. A method as defined in claim 26 new translation engine and update of the repository's atomic data model are generated from a determination of correspondences between the new tool's data model and the structure of the repository's current atomic data model.

28. A method as defined in claim 27 further comprising the step of updating the translation engines in response to the repository's updated atomic data model.

29. An information repository system comprising:
   A. a computer; and
   B. a control subsystem for controlling said computer comprising:
      i. an atomic information repository module for enabling said computer to maintain an atomic information repository for storing data items for accessing by a plurality of data processing tools, each tool having a respective data model, each data model defining at least one class each having at least one data item with an associated attribute, said attribute having at least one value, at least one class associated with the data model of at least one tool having a plurality of subclasses each comprising a said class associated with another of said tools, the data items being organized in said atomic information repository in an atomic data model corresponding to the combination of the data models associated with all of a plurality of data processing tools; and
      ii. a plurality of generated translation engine modules each associated with a said tool, each translation engine enabling said computer to (i) receive an access request from its associated tool in the associated tool's data model, (ii) perform a translation operation to translate the request from the associated tool's data model to the repository's atomic data model, and (iii) initiate an access operation with the repository in connection with the translated access request.

30. An information repository system as defined in claim 29 further comprising a plurality of data processing tools, each tool processing data in accordance with its associated data model, each tool generating an access request for accessing data in accordance with its associated data model.

31. An information repository system as defined in claim 29 in which at one translation engine module enables said computer to receives from its associated tool an access request of a retrieval type to initiate retrieval of data items from said repository, said at least one translation engine module enabling said computer to, in response to said retrieval access request, translate the retrieval access request into at least one translated access request in accordance with the associated tool's data model.

32. An information repository system as defined in claim 31 in which said repository module enables said computer to, in response to receipt of a translated access request, provide at least one data item to said at least one translation engine, said at least one translation engine module enabling said computer to format said at least one data item in accordance with its associated tool's data model for provision to the associated tool.

33. An information repository system as defined in claim 31 in which at one translation engine module enables said computer to receive from its associated tool an access request of a retrieval type to initiate retrieval of data from said repository, said at least one translation engine module enabling said computer to, in response to said retrieval access request, translate the retrieval access request into one or more translated access requests all in accordance with the associated tool's data model.

34. An information repository system as defined in claim 33 in which said repository module enables said computer to, in response to receipt of said translated access requests from said at least one translation engine, provide one or more data items for processing under control of at least one translation engine module, said at least one translation engine module enabling said computer to format said at least one or more data items in accordance with its associated tool's data model for provision as the requested data to the associated tool.

35. An information repository system as defined in claim 29 in which at least one translation engine module enables said computer to receive from its associated tool an access request of a storage type to initiate storage of at least one data item in said repository, said at least one translation engine module enabling said computer to translate the storage access request into at least one translated access request in accordance with the associated tool's data model, said translated access request including said at least one data item.

36. An information repository system as defined in claim 35 in which said repository module enables said computer, in response to receipt of said translated access request, store said at least one data item in accordance with said translated access request.

37. An information repository system as defined in claim 35 in which at least one translation engine module enables said computer to receive from its associated tool an access request of a storage type to initiate storage of data in said repository, said at least one translation engine enabling said computer to translate the storage access request into one or more translated access requests all in accordance with the associated tool's data model, each said translated access request including a data item for storage in said repository.

38. An information repository system as defined in claim 35 in which the data models of said tools define a plurality of hierarchical classes defined according to an entity-relationship model, the atomic data model also having a plurality of classes defined according to an entity-relationship model, for each class in each tool's data model one class in the repository's data model being identified as a master class and other classes in the repository's data model being identified as secondary classes, the entity-relationship atomic data model defining a directed graph for each tool from a master class through a series of said secondary classes.

39. An information repository system as defined in claim 38 in which at least one translation engine receives from its associated tool an access request of a storage type to initiate storage of data items in said repository, said at least one translation engine being responsive to said storage access request for translating the storage access request into a plurality of translated access requests all in accordance with the associated tool's data model, each said translated access request including a data item for storage in said repository thereby to generate a said directed graph associated with the data items being stored.

40. An information repository system as defined in claim 29 further comprising a system manager module for enabling said computer to generate a new translation engine for a new tool and update the repository's atomic data model.

41. An information repository system as defined in claim 40 in which the system manager module enables said computer to generate said new translation engine and update the repository's atomic data model from a determination of correspondences between the new tool's data model and the structure of the repository's current atomic data model.

42. An information repository system as defined in claim 41 in which the system manager module further enables said computer to update the translation engines in response to the repository's updated atomic data model.

43. A control subsystem for use in connection with a computer to form an information repository system, said control subsystem comprising:
   A. an atomic information repository module for enabling said computer to maintain an atomic information repository for storing data items for accessing by a plurality of data processing tools, each tool having a respective data model, each data model defining at least one class each having at least one data item with an associated attribute, said attribute having at least one value, at least one class associated with the data model of at least one tool having a plurality of subclasses each comprising a said class associated with another of said tools, the data items being organized in said atomic information repository in an atomic data model corresponding to the combination of the data models associated with all of a plurality of data processing tools; and
   B. a plurality of generated translation engine modules each associated with a said tool, each translation engine enabling said computer to (i) receive an access request from its associated tool in the associated tool's data model, (ii) perform a translation operation to translate the request from the associated tool's data model to the repository's atomic data model, and (iii) initiate an access operation with the repository in connection with the translated access request.

44. A control subsystem as defined in claim 43 further comprising a plurality of data processing tools, each tool processing data in accordance with its associated data model, each tool generating an access request for accessing data in accordance with its associated data model.

45. A control subsystem as defined in claim 43 in which at one translation engine module enables said computer to receives from its associated tool an access request of a retrieval type to initiate retrieval of data items from said repository, said at least one translation engine module enabling said computer to, in response to said retrieval access request, translate the retrieval access request into at least one translated access request in accordance with the associated tool's data model.

46. A control subsystem as defined in claim 45 in which said repository module enables said computer to, in response to receipt of a translated access request, provide at least one data item to said at least one translation engine, said at least one translation engine module enabling said computer to format said at least one data item in accordance with its associated tool's data model for provision to the associated tool.

47. A control subsystem as defined in claim 45 in which at one translation engine module enables said computer to receive from its associated tool an access request of a retrieval type to initiate retrieval of data from said repository, said at least one translation engine module enabling said computer to, in response to said retrieval access request, translate the retrieval access request into one or more translated access requests all in accordance with the associated tool's data model.

48. A control subsystem as defined in claim 47 in which said repository module enables said computer to, in response to receipt of said translated access requests from said at least one translation engine, provide one or more data items for processing under control of at least one translation engine module, said at least one translation engine module enabling said computer to format said at least one or more data items in accordance with its associated tool's data model for provision as the requested data to the associated tool.

49. A control subsystem as defined in claim 43 in which at least one translation engine module enables said computer to receive from its associated tool an access request of a storage type to initiate storage of at least one data item in said repository, said at least one translation engine module enabling said computer to translate the storage access request into at least one translated access request in accordance with the associated tool's data model, said translated access request including said at least one data item.

50. A control subsystem as defined in claim 49 in which said repository module enables said computer, in response to receipt of said translated access request, store said at least one data item in accordance with said translated access request.

51. A control subsystem as defined in claim 49 in which at least one translation engine module enables said computer to receive from its associated tool an access request of a storage type to initiate storage of data in said repository, said at least one translation engine enabling said computer to translate the storage access request into one or more translated access requests all in accordance with the associated tool's data model, each said translated access request including a data item for storage in said repository.

52. A control subsystem as defined in claim 49 in which the data models of said tools define a plurality of hierarchical classes defined according to an entity-relationship model, the atomic data model also having a plurality of classes defined according to an entity-relationship model, for each class in each tool's data model one class in the repository's data model being identified as a master class and other classes in the repository's data model being identified as secondary classes, the entity-relationship atomic data model defining a directed graph for each tool from a master class through a series of said secondary classes.

53. A control subsystem as defined in claim 52 in which at one translation engine module enables said computer to receive from its associated tool an access request of a storage type to initiate storage of data items in said repository, said at least one translation engine enabling said computer to, in response to said storage access request, translate the storage access request into a plurality of translated access requests all in accordance with the associated tool's data model, each said translated access request including a data item for storage in said repository thereby to generate a said directed graph associated with the data items being stored.

54. A control subsystem as defined in claim 43 further comprising a system manager module for enabling said computer to generate a new translation engine for a new tool and update the repository's atomic data model.

55. A control subsystem as defined in claim 54 in which the system manager module enables said computer to generate said new translation engine and update the repository's atomic data model from a determination of correspondences between the new tool's data model and the structure of the repository's current atomic data model.

56. A control subsystem as defined in claim 55 in which the system manager module further enables said computer to update the translation engines in response to the repository's updated atomic data model.

* * * * *